(12) United States Patent
Moretto

(10) Patent No.: US 6,428,687 B1
(45) Date of Patent: Aug. 6, 2002

(54) FILTER CARTRIDGE, PARTICULARLY FOR JUG WATER PURIFIERS

(75) Inventor: Leonida Moretto, Vicenza (IT)

(73) Assignee: Laica S.R.L., Vincentino (IT)

( * ) Notice: Subject to any disclaimer, the term of this patent is extended or adjusted under 35 U.S.C. 154(b) by 0 days.

(21) Appl. No.: 09/622,224

(22) PCT Filed: Feb. 3, 1999

(86) PCT No.: PCT/EP99/00712
§ 371 (c)(1),
(2), (4) Date: Aug. 15, 2000

(87) PCT Pub. No.: WO99/41201
PCT Pub. Date: Aug. 19, 1999

(30) Foreign Application Priority Data

Feb. 16, 1998 (IT) .......................... PD98A0030

(51) Int. Cl.[7] .............................................. B01D 27/02
(52) U.S. Cl. ....................................... 210/100; 210/282
(58) Field of Search ........................ 210/87, 100, 282

(56) References Cited

U.S. PATENT DOCUMENTS

| | | | |
|---|---|---|---|
| 3,038,610 A | * | 6/1962 | Hetherington ............. 210/96.1 |
| 3,503,507 A | | 3/1970 | Raupp et al. ............... 210/96.1 |
| 3,586,018 A | | 6/1971 | Bogardh et al. ............... 137/67 |
| 4,302,337 A | * | 11/1981 | Larson et al. ................. 210/90 |
| 4,588,500 A | * | 5/1986 | Sprenger et al. ............ 210/100 |
| 4,681,677 A | | 7/1987 | Kuh et al. ..................... 210/88 |
| 4,769,135 A | | 9/1988 | Norton ......................... 210/88 |
| 4,772,386 A | | 9/1988 | Girout et al. ................. 210/91 |
| 5,190,643 A | * | 3/1993 | Duncan et al. ............. 210/282 |

FOREIGN PATENT DOCUMENTS

| WO | WO96 03193 | | 2/1996 |
|---|---|---|---|
| WO | WO 96/13318 | * | 5/1996 |
| WO | WO96 15994 | | 5/1996 |

* cited by examiner

Primary Examiner—Ivars Cintins
(74) Attorney, Agent, or Firm—Sughrue Mion, PLLC

(57) ABSTRACT

In a device for shutting off the flow of a fluid through a duct, preferably in a system for filtering drinking water, means for shutting off the duct comprise at least one obturator (14,22, 35,43) disposed over a corresponding orifice (11) of the duct and means (15,23,36) for restraining the obturator (14,22, 35,43) in a position such that the corresponding orifice (11) is not shut off, the restraining means being exposed to the flow of fluid through the duct and being able to undergo a change of state consequent upon the period of exposure to the flow in order to release the obturator (14,22,35) so that it shuts off the duct after a predetermined flow of fluid has taken place through the duct.

1 Claim, 4 Drawing Sheets

FILTER CARTRIDGE, PARTICULARLY FOR JUG WATER PURIFIERS

TECHNICAL FIELD

The present invention. relates to an improved filter cartridge, particularly for jug or carafe water purifiers, according to the preamble to the main claim.

BACKGROUND ART

The use of filtering systems with replaceable cartridges for cleansing the drinking water of organoleptically unpleasant odours and flavours is widespread.

Typically, activated-carbon filters are used and these have to be replaced after a predetermined number of filtering cycles. The cartridge contains a bed of activated carbon and in turn separates two compartments of a jug, for holding water to be filtered and filtered water, respectively.

To prevent the user from being able to use the same cartridge for a greater number of cycles than is compatible with effective operation of the cartridge, these filtering systems generally have counters which can block access to the jug to prevent new water from being admitted to the compartment for water to be filtered once the count indicates that the filtering capacity of the cartridge is probably exhausted.

The main disadvantage of these counter systems is that it is generally possible to zero the countermand clear the access to the jug without replacing the cartridge and thus to make further use of an exhausted cartridge.

Although this does not lead to any particular problems beyond inadequate purification of the water treated when the purpose of the system is limited to the cleansing of the water of unpleasant odours and flavours, clearly this system cannot be used with the necessary safety when the filtering cartridge is required to cleanse the water being treated of microbial and/or bacteriological loads, that is, when it is required actually to make the water drinkable.

In this case, it is essential for the flow of water through the filtering system to be prevented once and for all as soon as circumstances arise such that the filtering capacity of the cartridge should be considered to be exhausted, for example, after the treatment of a predetermined number of litres of water to be made drinkable. Otherwise, the user would be drinking not only inadequately deodorized water, but water which is potentially polluted by bacteria and other organisms or substances hazardous to health.

Valves or similar mechanisms capable per se of shutting off a duct after a predetermined flow has passed through it are known, for example, from U.S. Pat. Nos. 4,681,677, 3,586,018, 3,503,507, 4,772,386 and 4,769,135.

The mechanisms described therein are used in various fields but none of them is suitable for direct application, as in the case of the present invention, to disposable filter cartridges such as those used in jug water purifiers for domestic use.

DISCLOSURE OF THE INVENTION

The main aim of the present invention is to provide a filter cartridge which can be used quite safely for making water drinkable as well as possibly cleansing it of undesired odours and flavours in jug or carafe purifiers for domestic use.

Within the scope of this aim, the object of the invention is to provide a replaceable filter cartridge which can be produced easily and inexpensively so that the device for shutting off the flow of fluid being treated can be incorporated directly in the replaceable cartridge in order to block the cartridge once its filtering capacity is exhausted.

This and other objects are achieved by the invention by means of a filter cartridge formed in accordance with the following claims.

BRIEF DESCRIPTION OF THE DRAWINGS

The characteristics and advantages of the invention will become clearer. from the following detailed description of some embodiments thereof, described by way of non-limiting example, with reference to the appended drawings, in which.

BEST MODE OF CARRYING OUT THE INVENTION

Figure 1:
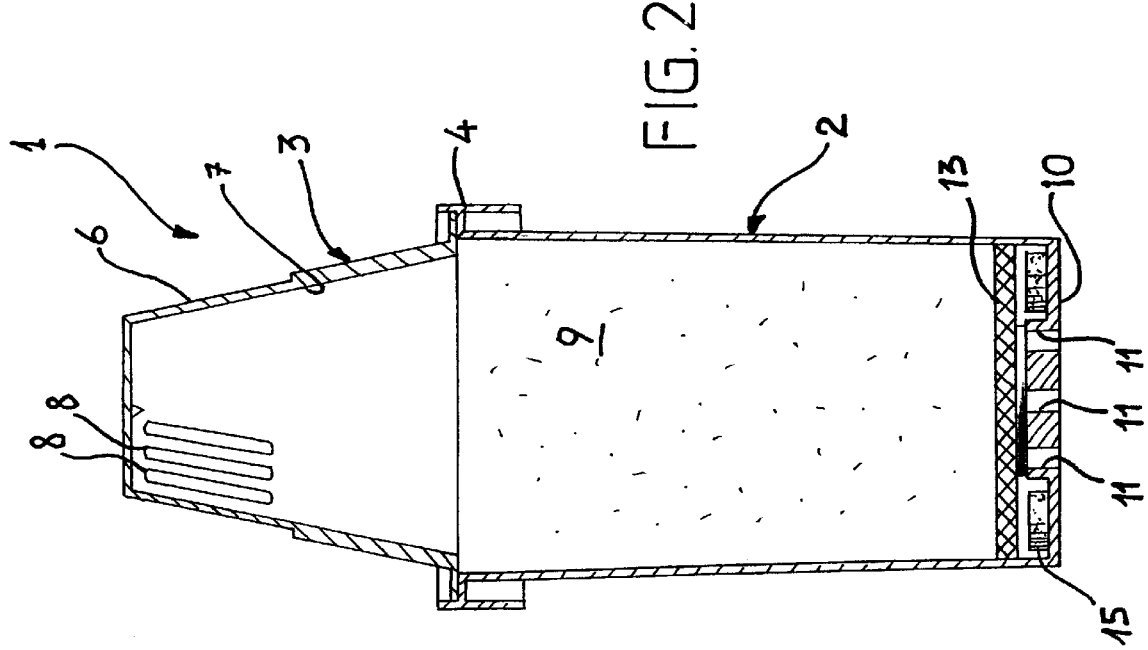
FIGS. 1 and 2 are schematic cross-sections of a first embodiment of a replaceable cartridge for filtering jugs or carafes according to the invention, with a new cartridge and with an exhausted cartridge, respectively.

In FIGS. 1 to 8, a filter cartridge, generally indicated 1, is of the type normally used in jug-like containers in which the cartridge is located removably in the duct between an upper compartment of the jug to which the water to be filtered is admitted, and a lower compartment in which the filtered water is collected. An example of these jugs is described in WO 96/13318.

In the cartridge 1, a lower beaker-like portion 2 and an upper portion 3 which constitutes a frustoconical lid thereof, are shown. These portions are joined together in the region of an intermediate flange 4.

The upper portion 3 has, in the upper region 6 of its frustoconical shell 7, a plurality of slots 8 together constituting a first duct for the admission of the water to be filtered to the cartridge 1.

The lower portion 2 contains a filtering means 9 of known composition, for example, a bed of activated carbon and, in its base 10, has a plurality of holes 11 together constituting a second duct through which the purified fluid can flow out of the cartridge towards the lower compartment of the jug. A permeable membrane 13 is interposed between the filtering means 9 and the base 10.

Figure 2:
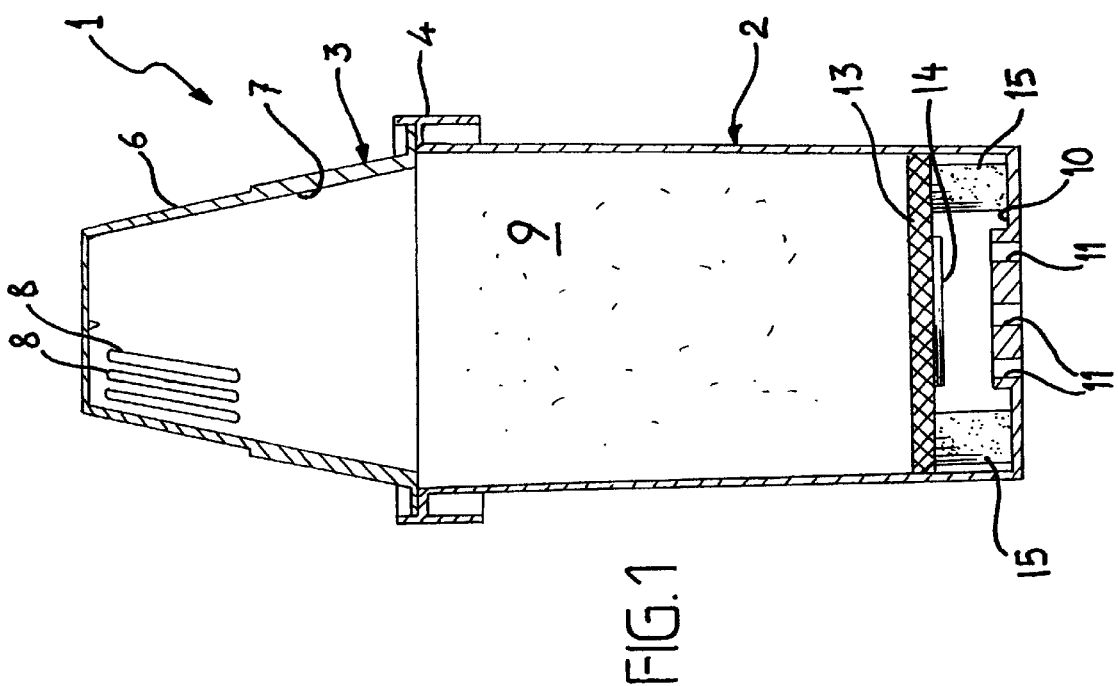

With specific reference now to a first embodiment of the invention shown in FIGS. 1 and 2, an obturator is provided for blocking the second duct constituted by the holes 11 upon the exhaustion of the filtering capacity of the filtering means 9, which is determined in dependence on the number of litres of water treated, the obturator being constituted by an impermeable disc 14 which is fixed to the face of the permeable membrane 13 on the side facing the base 10 and which can be disposed over the holes 11 so as to shut off their through-orifices when it bears on the base 10. The membrane 13 is kept away from the base 10 so that the orifices of the holes 11 are normally open, by an annular spacer 15 interposed between the base 10 and the membrane 13. The spacer 15 constitutes means for restraining the obturator 14 in a position in which the corresponding orifices are not shut off and is made of a known synthetic material (which is used for making the capsules of some medicinal preparations or for so-called slow-release drugs) which is inert for drinking purposes and is not dangerous to man and which can dissolve slowly in contact with the flow of fluid (water) to be filtered. The means for restraining the obturator can thus undergo a change of state consequent upon the period of exposure to the flow of water in order to release the obturator so that it shuts off the second duct, as shown in FIG. 2, after a predetermined flow of, fluid has taken place through the filtering means 9 and the spacer 15 has consequently been partially dissolved.

Figure 3:
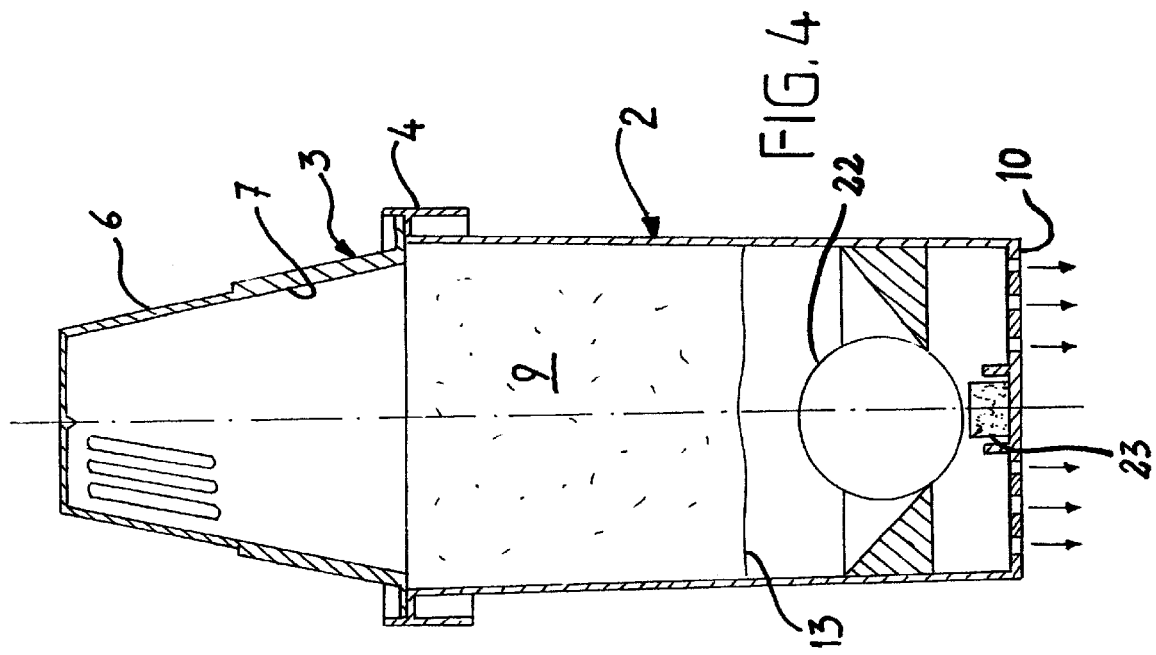
FIGS. 3 and 4 are schematic cross-sections of a second embodiment of the cartridge according to the invention in the same operative conditions as FIGS. 1 and 2, respectively.
Figure 4:
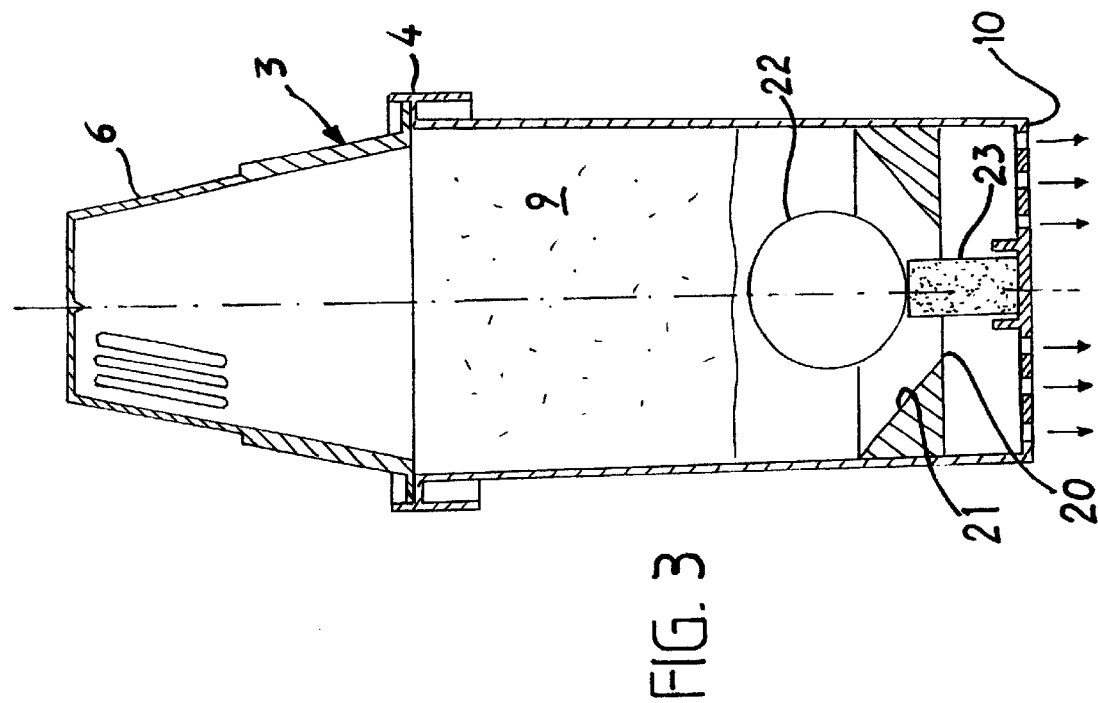

FIGS. 3 and 4 show a second embodiment of the invention in which the duct 20 to be shut off has a conical seat 21 for a spherical obturator 22 which is kept in a position in which it does not shut off the duct by a spacer 23 interposed between the obturator and the base 10. The spacer 23 in this case is constituted by a small cylinder of the same material of which the spacer 15 is made.

Figure 6:
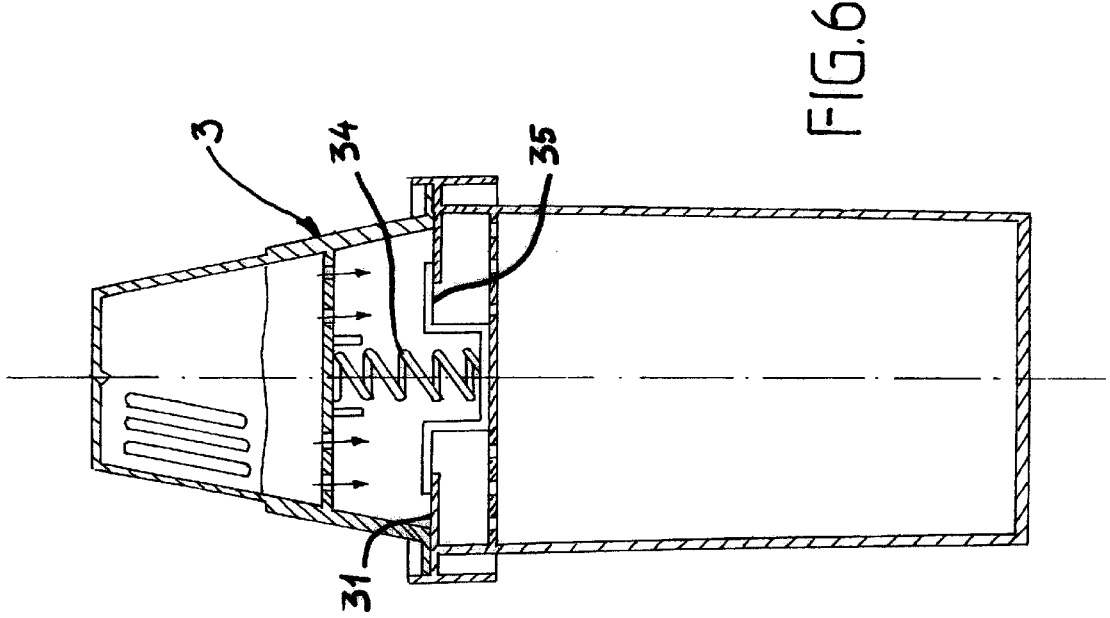
FIGS. 5, 6 and 7, 8 are schematic cross-sections of a third and a fourth embodiment of the cartridge according to the invention, respectively, in the same operative conditions as FIGS. 1 and 2, respectively.
Figure 5:
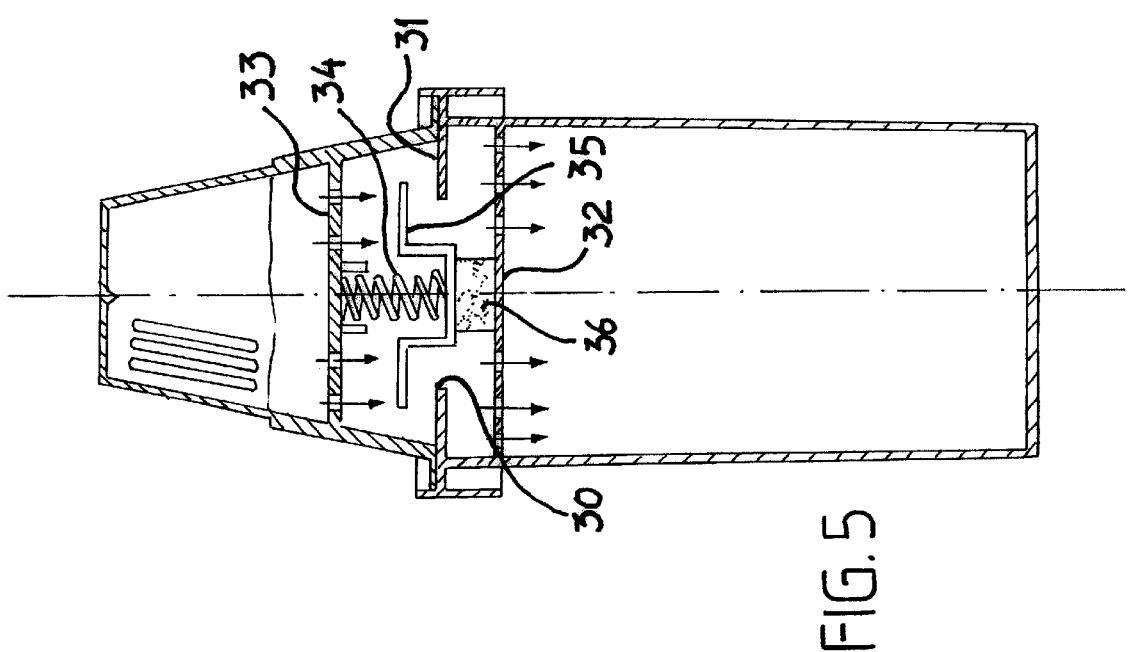

In the embodiment of FIGS. 5 and 6, the duct 30 to be shut off is formed in a flange 31 located between a first membrane 32 which is disposed above the filtering means and a second membrane 33 located in the upper portion 3 of the cartridge and serving as an abutment for a spring 34. This spring 34 is compressed between the second membrane 33 and a plate-like obturator 35 which, when disposed on the flange 31, can close the duct 30. The duct is normally kept open by a spacer 36 interposed between the obturator 35 and the first membrane 32; this spacer is made of a material similar to that of the preceding embodiments. As a result of the dissolving of the spacer 36, the obturator is urged into closure over the duct 30 by the spring 34 (FIG. 6).

In a fourth embodiment of the invention, the duct to be shut off is constituted by a chamber 40 defined between the base 10 and a permeable membrane 41 fixed to the inside of the lower portion 2 of the cartridge.

The obturator for this duct is made of a material which expands greatly when put in contact with the fluid to be filtered, for example, a polymeric resin to which starch molecules cling. This material is compressed to form the centre 42 of a capsule 43, the outer shell 44 of which is constituted by an impermeable coating made of the same material, which is slowly soluble in water, as the spacers of the previous embodiments.

Figure 8:
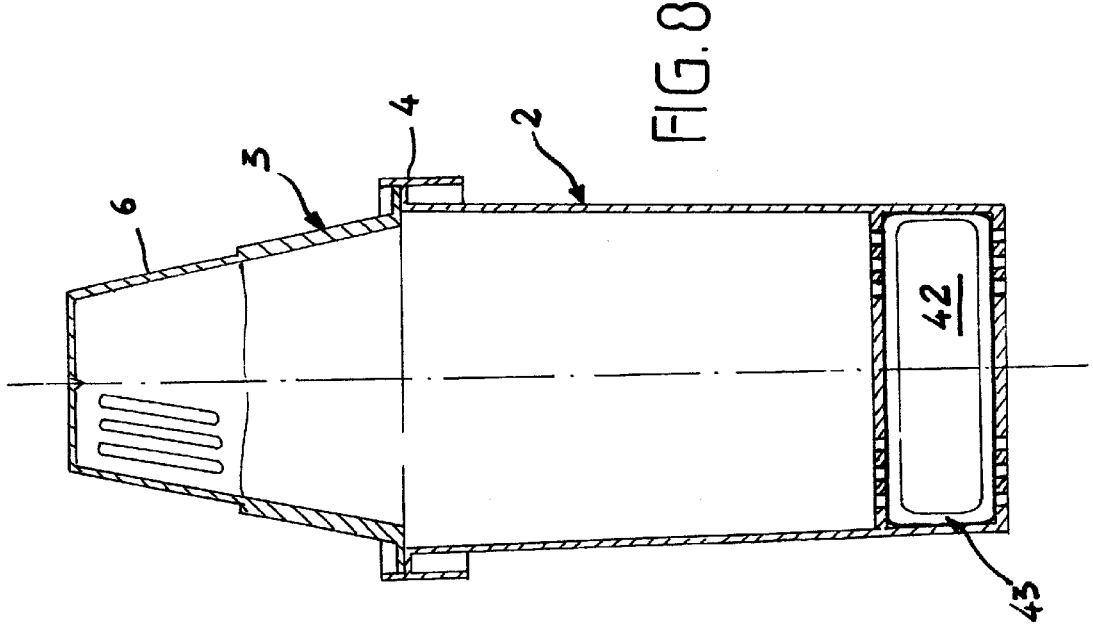
Figure 7:
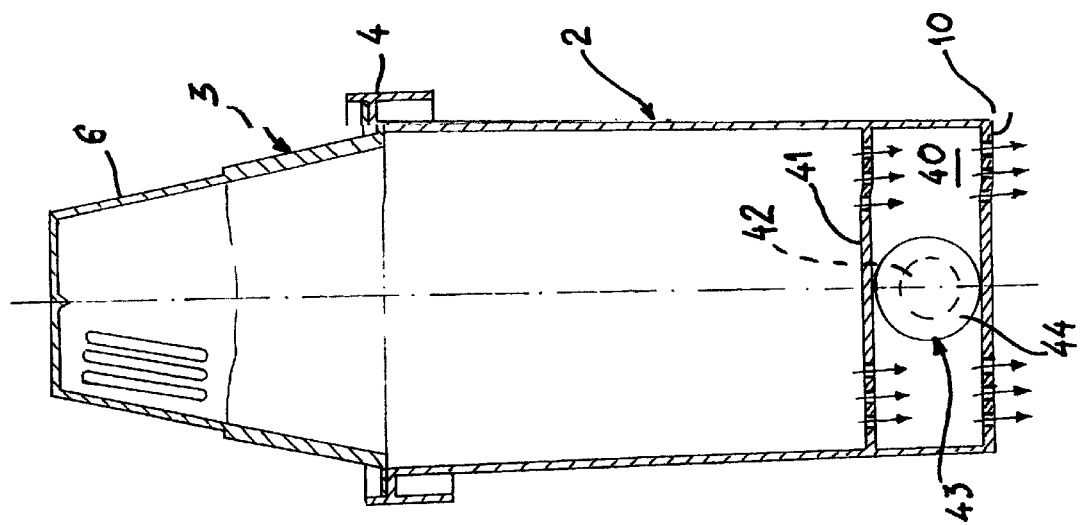

As shown in FIG. 8, once the capsule 43 has been exposed to the flow of filtered water for sufficient time to dissolve the shell 44 at least partially, the centre 42 expands greatly thus shutting off the respective duct.

What is claimed is:

1. If A water filter cartridge comprising a container having a first chamber having an inlet end and an outlet end, a supply of filtering material disposed in said first chamber, a second chamber defined between two permeable walls one of which is adjacent the outlet end of said first chamber and a shut-off means for controlling the flow of water through the second chamber, said shut-off means comprising at least one capsule disposed in the second chamber and comprised of a center portion of a material expandable upon contact with water and an outer shell surrounding the center portion wherein the outer shell is comprised of a water soluble material which dissolves upon contact with water whereby the center portion will expand when the outer shell dissolves to substantially fill said second chamber to block the flow of water therethrough.

* * * * *